July 23, 1940.　　　　G. M. LEWIS　　　　2,208,992
SEWING MACHINE AND ATTACHMENT THEREFOR
Original Filed May 11, 1937　　7 Sheets-Sheet 2
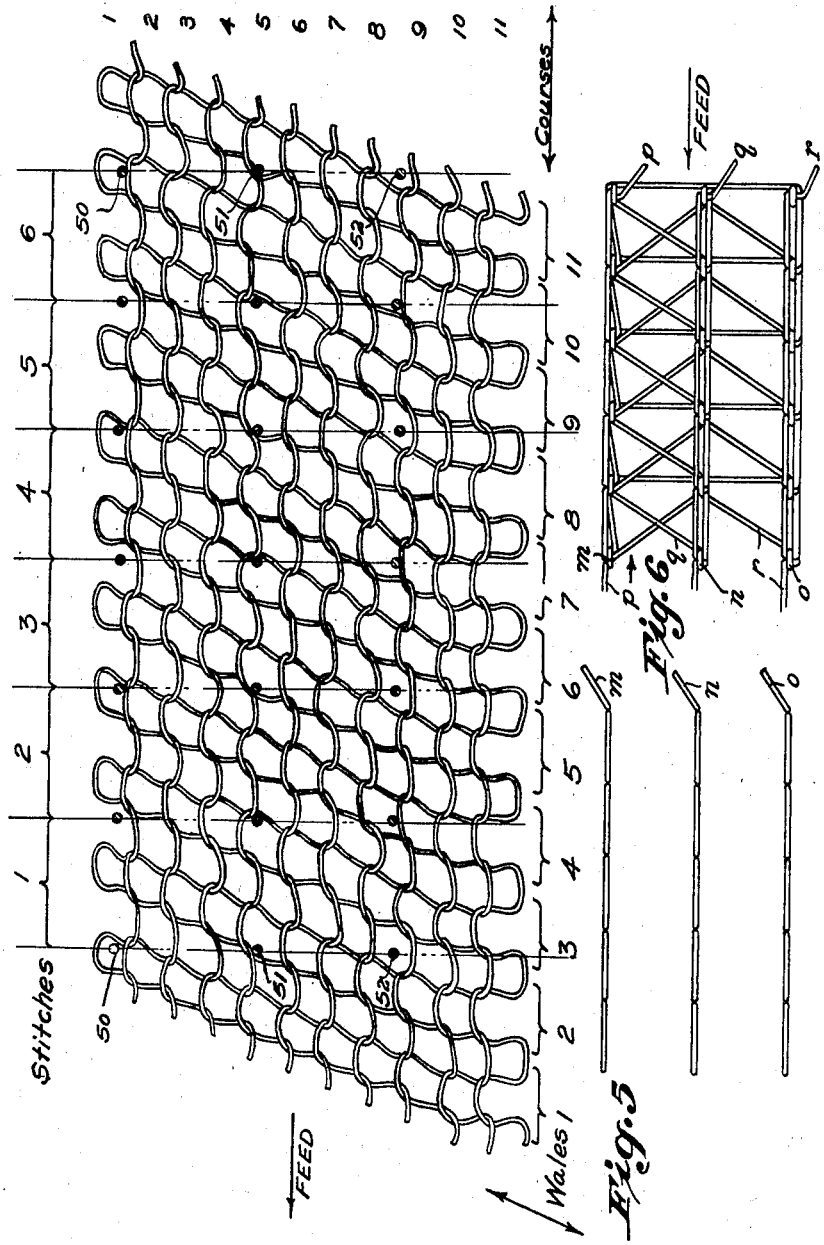
Inventor
Griffith M. Lewis
By Mauro & Lewis
Attorneys

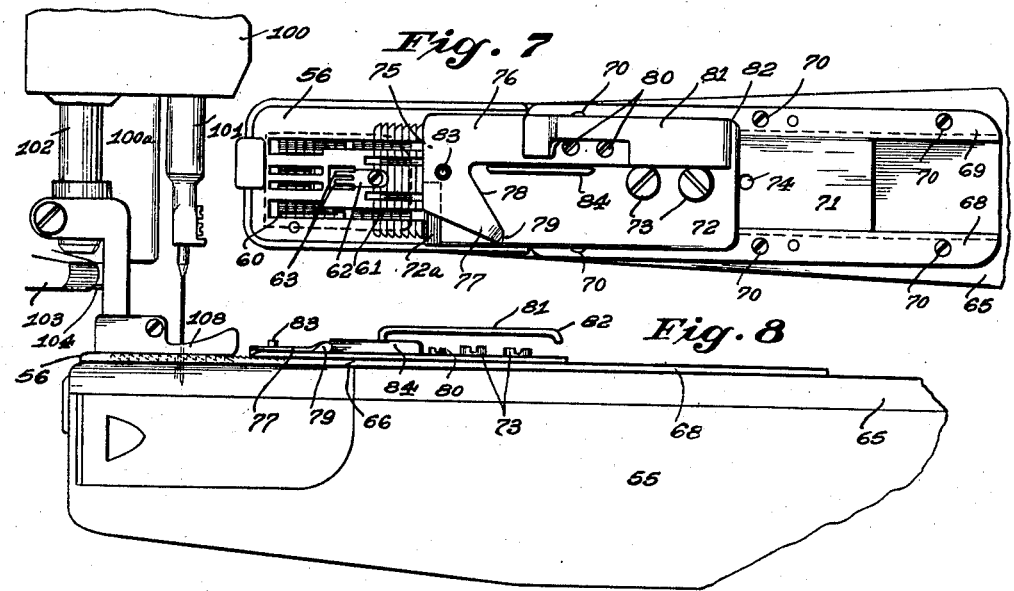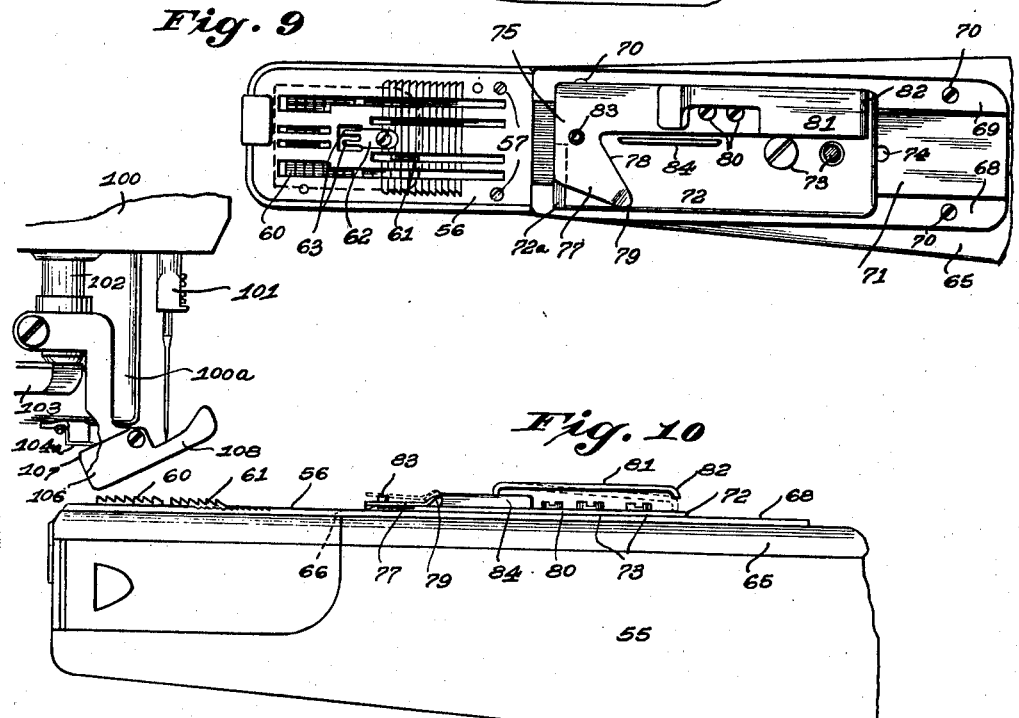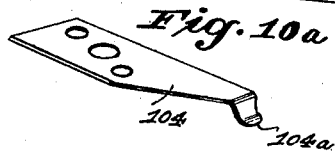

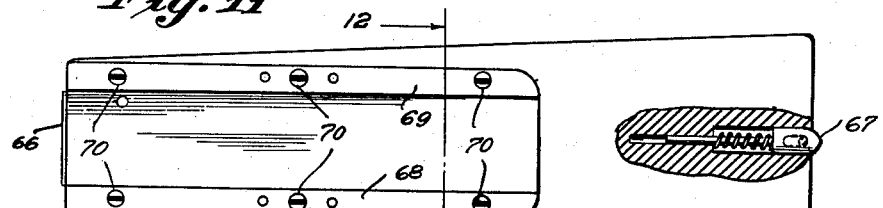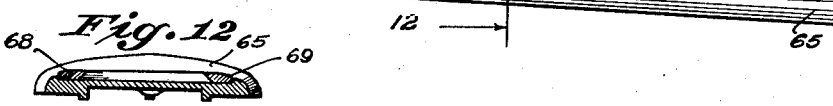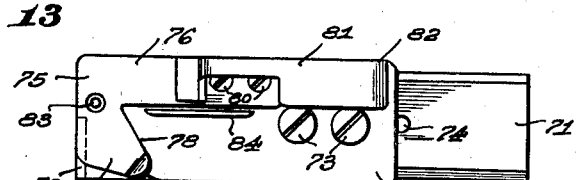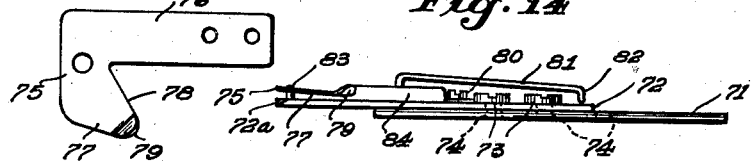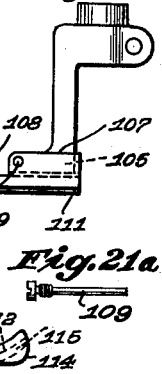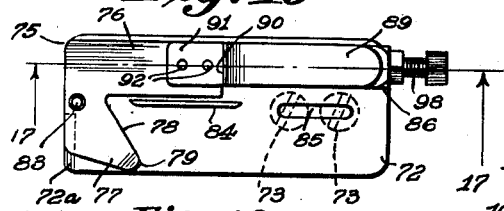

July 23, 1940.  G. M. LEWIS  2,208,992
SEWING MACHINE AND ATTACHMENT THEREFOR
Original Filed May 11, 1937   7 Sheets-Sheet 5

Inventor
Griffith M. Lewis
By Mauro & Lewis
Attorney

July 23, 1940.  G. M. LEWIS  2,208,992
SEWING MACHINE AND ATTACHMENT THEREFOR
Original Filed May 11, 1937  7 Sheets-Sheet 7
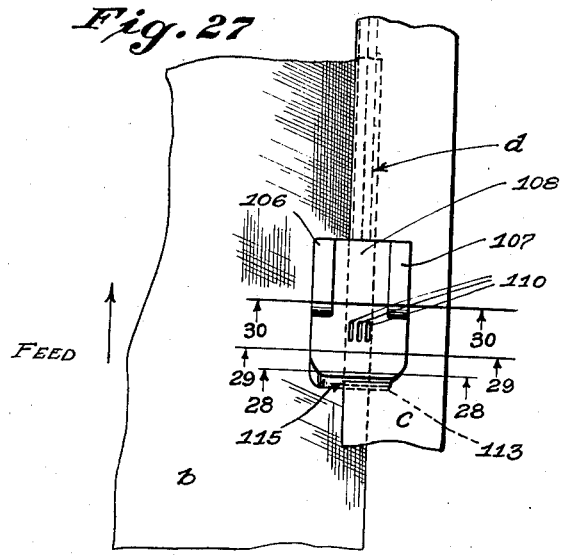
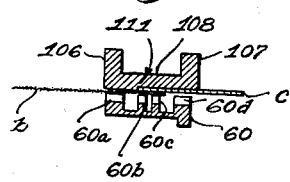
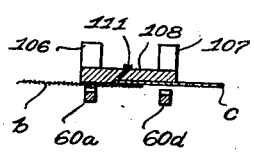
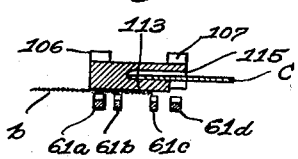
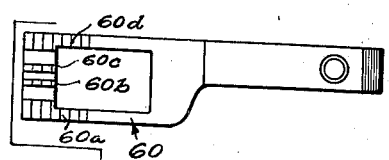
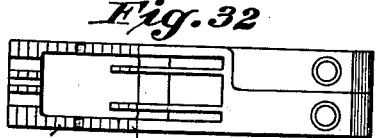
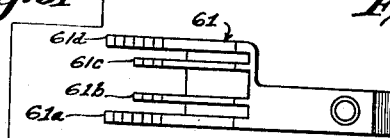
Inventor
Griffith M. Lewis
By Mann & Lewis
Attorneys Patented July 23, 1940

2,208,992

UNITED STATES PATENT OFFICE 2,208,992

SEWING MACHINE AND ATTACHMENT THEREFOR

Griffith M. Lewis, Watervliet, N. Y., assignor to Willcox & Gibbs Sewing Machine Co., New York, N. Y., a corporation of New York Original application May 11, 1937, Serial No. 142,029. Divided and this application February 28, 1938, Serial No. 193,193

7 Claims. (Cl. 112—136)

This invention relates to sewing machines and parts thereof and attachments therefor particularly adapted for the carrying out of part of the method described and claimed in my original application Ser. No. 142,029, filed May 11, 1937, for Stockings and process and apparatus for making same, and of which the present application is a division.

In the accompanying drawings illustrative of the present invention, and wherein—

Fig. 4 (Sheet 2) is a diagrammatic or schematic view on a much enlarged scale, illustrating the manner in which the three thread-carrying needles of the three-needle machine, used in sewing the elastic material to the top edge of the knitted material of the stocking, penetrates the loops of the knitted material in said operation;

Fig. 5 is a plan view, also on an enlarged scale, from the top or right side of the seam formed by said three-needle machine and showing the appearance of the three parallel rows of stitches of the seam;

Fig. 6 is a similar view from the bottom or wrong side of the seam;

Fig. 7 (Sheet 3) is a top plan view of the free end of the work-supporting arm of the three-needle feed-off-the-arm sewing machine used in sewing the elastic material to the knitted fabric, the edge uncurler being shown in said Fig. 7 as moved to its forward position toward the needles and presser-foot;

Fig. 8 is a view in side elevation of Fig. 7 and showing also the presser-foot, presser-foot bar, needles, and needle bar, and a portion of the overhanging head of the sewing machine from which said parts depend;

Fig. 9 is a view similar to Fig. 7, but with the edge uncurler moved to its position away from the needles and presser-foot;

Fig. 10 is a view in side elevation, similar to Fig. 8, but showing the uncurler in withdrawn position similar to that in which said part is shown in Fig. 9 and also showing the presser-foot lifted and tilted upward at its forward end;

Fig. 10a is a detail perspective view of a flat spring which tilts the presser-foot to the position in which said foot is shown in Fig. 10;

Fig. 11 (Sheet 4) shows in plan view the cover plate for the work supporting part of the work-arm, the uncurler, which is slidingly mounted on said plate, as shown in Figs. 7–9, being omitted from Fig. 11;

Fig. 12 is a transverse section on the line 12—12 of Fig. 11;

Fig. 13 is a plan view and Fig. 14 is a side elevation of the uncurler;

Figs. 15, 16 and 17 are respectively a top plan view, a side elevation, and a longitudinal section on line 17—17 of Fig. 15, all showing a modified construction of the uncurler;

Figs. 18, 19, 20, 21, 21a and 22 are views of the presser-foot (shown in Figs. 6 and 8), Fig. 18 being a front elevation, Fig. 19 a top plan view, Fig. 20 a bottom plan view, Fig. 21 a side elevation from the left of Fig. 18, Fig. 21a a detail view of a pivot screw, and Fig. 22 a side elevation from the right of Fig. 18;

Figure 23:
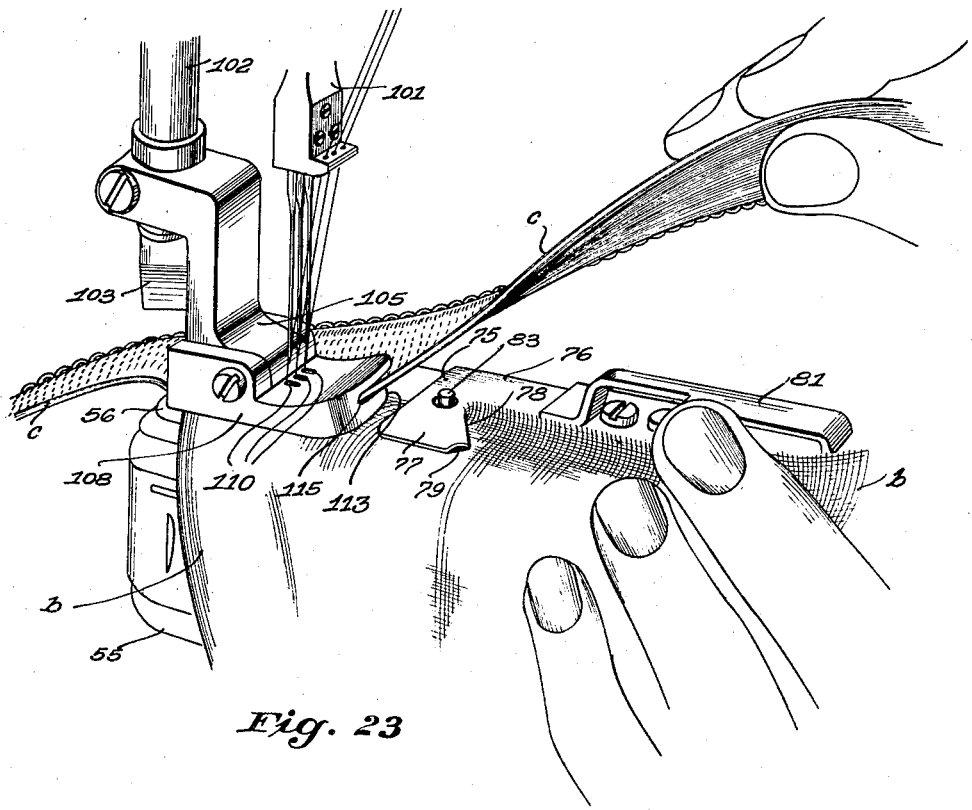
Figure 24:
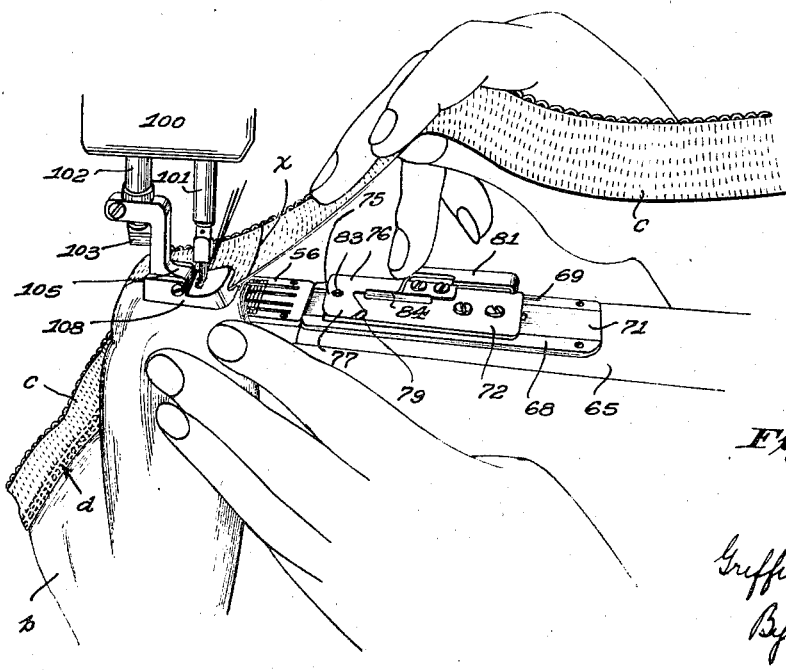
Figure 25:
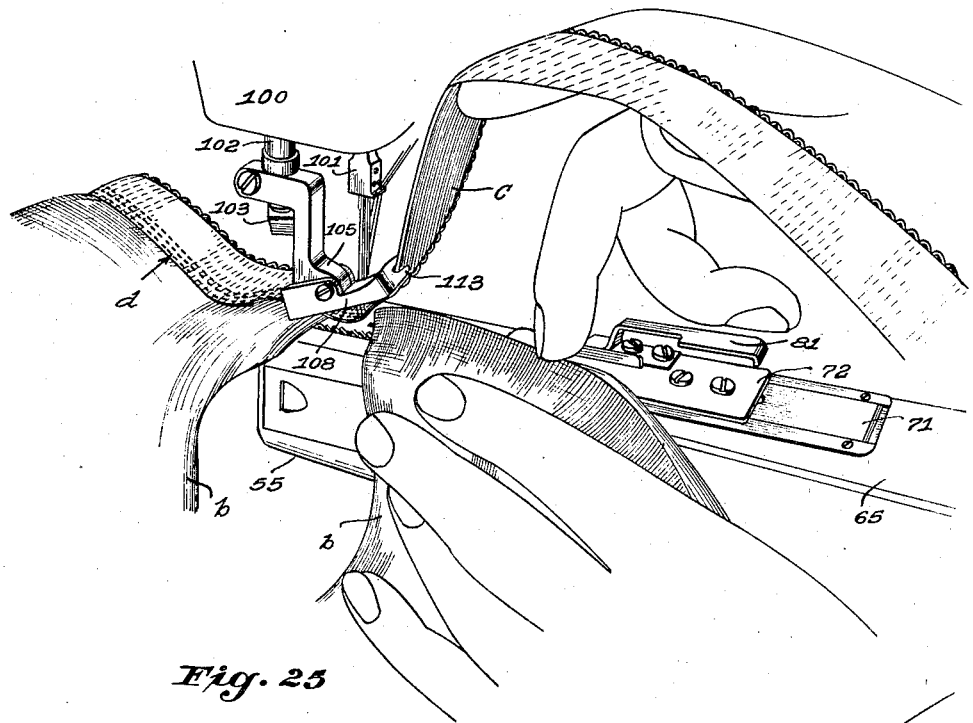
Figure 26:
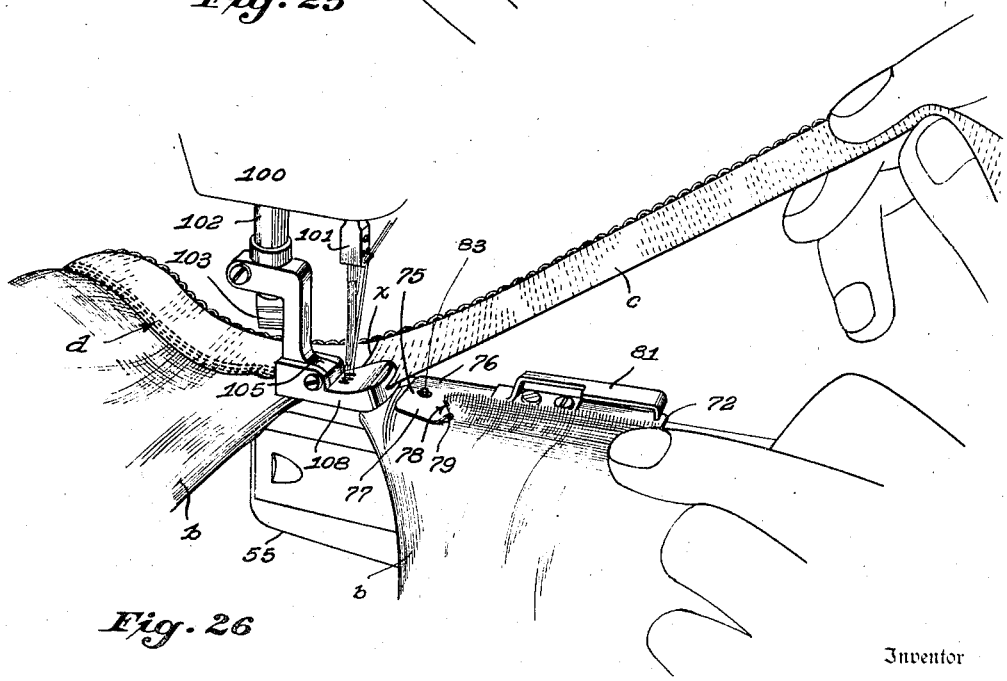

Figs. 23 and 24 (Sheet 5) and Figs. 25 and 26 (Sheet 6) are perspective views illustrating different stages in the operation of sewing the elastic material to the top edge of the woven material of the stocking, and also showing the three needles and the free end of the work-arm, but omitting other parts of the sewing machine;

Fig. 27 (Sheet 7) is a diagrammatic and schematic plan view of sections of the knitted material and elastic or garter material of a stocking shown in their overlapped relationship as they pass beneath the presser-foot and are secured together by the seam formed by the three needle machine;

Figs. 28, 29 and 30 respectively are transverse vertical sectional views on lines 28—28, 29—29 and 30—30 of Fig. 27 and of Fig. 8 (Sheet 3), these views also showing feed dogs for engaging (through slots in a throat plate not shown in these figures) the underside of the work for feeding the same;

Fig. 31 is a plan view showing the two dogs of the differential feeding mechanism;

Fig. 32 is a plan view showing the two feed dogs in their operative partly overlapped relationship; and Fig. 33 is an edge view of Fig. 32.

Figure 1:
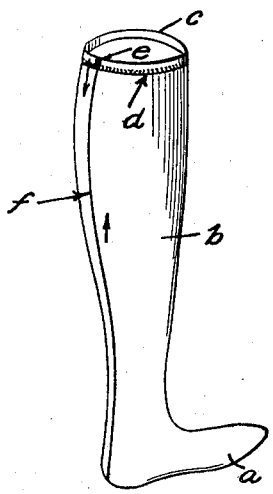
Fig. 1 is a perspective diagrammatic or outline view of a knee-length stocking to which the present invention is particularly related.

Fig. 1 shows in outline, and somewhat diagrammatically, a full-fashioned knee-length stocking to the production of which this invention is especially applicable. *a* is the foot portion, *b* the leg portion, and *e* the garter portion of elastic material or fabric. Garter portion *c* is attached to the upper or open end of the leg portion, which is of suitable knitted fabric, by a seam or stitching at *d*, said seam being formed on a sewing machine and is the first sewing machine operation of this invention. The lapped ends of the garter material *c* are then secured together by a seam or stitches at *e*, said seam being formed on a sewing machine (not shown) and the direction of feed being that indicated by an arrow. The stocking is then closed up the back of the leg by a seam or stitches at *f*, formed on a sewing machine (also not shown) and the direction of feed being indicated by an arrow.

Figure 2:
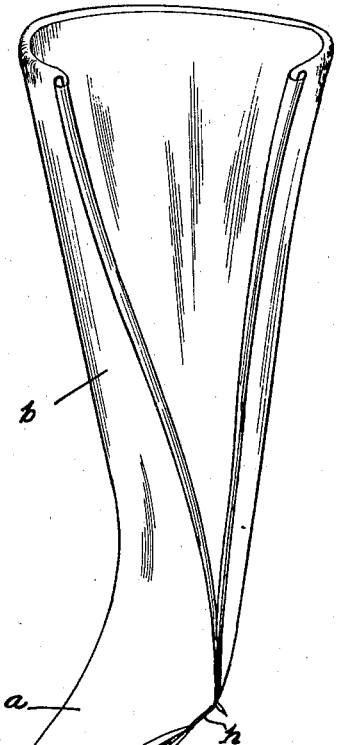
Fig. 2 is a perspective view of a partly made stocking as the same is produced on knitting and looping machinery and which is adapted to be finished to a complete stocking (such as that shown in Fig. 1) partly by use of the mechanism of this invention.

Fig. 2 illustrates the knitted foot and leg portions *a* and *b* (they are here shown wrong side out), or what might be called the "web," of a stocking as produced on knitting and looping machines, the edges of the knitted material being looped together, for a short distance at *g* at the toe of the stocking and for a short distance *h* at the heel of the stocking, on a looping machine. As is well known, the edges of knitted fabrics, especially of the kind commonly used in the manufacture of hosiery, when said edges are free and unrestrained, curl. This is shown in Fig. 2 where the lengthwise or longitudinal vertical edges running with the wales of the knitted fabric, curl outward from the right side to the wrong side of the fabric. Across the wales at the top of Fig. 2, the curl is inward from the wrong side to the right side of the knitted fabric.

Silk is the thread commonly used in making such stockings; rayon or artificial silk is sometimes used for cheaper grades; cotton thread may be used for still cheaper grades, but that is exceptional for full fashioned stockings. For reasons which will appear later, it is preferable to use cotton thread in forming a number of courses of the knitted loops at the extreme upper end of the leg portion of silk stockings. For subsequently finishing partly made stockings, such as shown in Fig. 2, the same are gathered together in bundles of a predetermined number of stockings of the same size, quality, etc. (usually twenty-four stockings to constitute a dozen pairs), and they are kept so segregated in distinct bundles throughout the operations of this invention.

Figure 3:
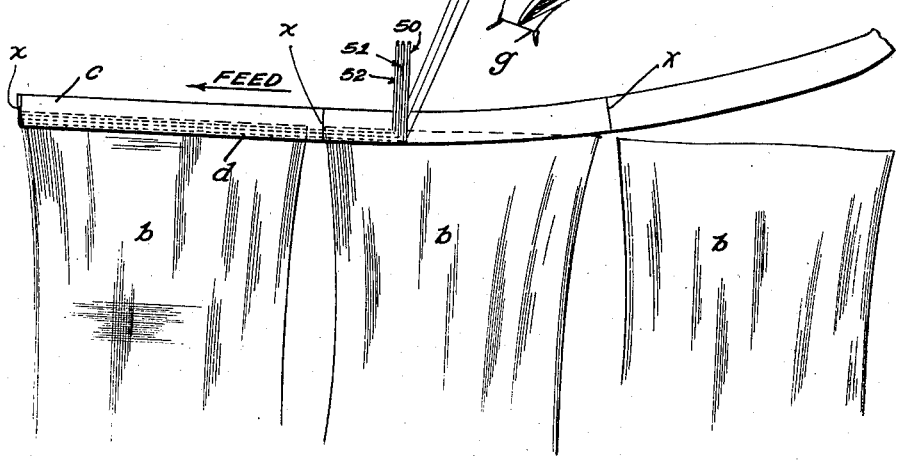
Fig. 3 is a partly diagrammatic view in elevation showing the sewing of a strip of elastic or garter material to the top edge of a plurality of partly made stockings such as shown in Fig. 2.

The first step of the method of producing the stocking shown in Fig. 1, is the attaching of the garter or elastic fabric *c* to the upper edges of the legs *b* of a plurality of stockings, or stocking webs, in succession, in the manner shown in Fig. 3, by the seam *d* formed on a sewing machine. The garter or elastic fabric *c* may be such as desired and procurable on the market; for example, it may be plain and closely woven, or of open-work type and of different designs.

For the purpose of describing one embodiment of the means of this invention, or of this part thereof, let the following conditions be assumed, to wit:

That the knitted fabric of the stocking leg *b* is of 46 gauge (which is a gauge quite commonly used), that is has approximately 28 wales per inch when spread or laid along an eleven inch measuring bar such as commonly used as the measure for the width of knitted fabric at the upper end of legs of full-fashioned knee length hosiery before the same is closed by the closing seam at the back;

That the length of stitches used in seam *d* is about 20 to an inch;

That the sewing machine used employs three thread-carrying needles 50, 51, 52 arranged abreast, that is, in line at right angles to the direction of line of feed (see Figs. 3 and 4), the outer needles 50 and 52 being spaced about $\frac{3}{32}$ of an inch apart and the needle 52 positioned midway between;

That the knitted fabric is fed past the needles with the wales at an incline or angle with relation to the alinement of the needles approximately, or not less than, that indicated diagrammatically in Fig. 4;

That the span of the three needles reaches about eight or nine courses of the knitted loops at the end of the stocking leg;

That a plurality of the stocking legs, such as *b, b, b*, Fig. 2, are fed through the sewing machine one after another and right side up;

That the elastic fabric *c*, Fig. 2, is sewed to the upper or right side of the knitted fabric while lapped thereon sufficiently for all three thread carrying needles to form stitches passing through both the elastic fabric and the knitted fabric; and That the stitches constituting seam *d* are formed through the elastic fabric *c* while it is in stretched condition, so that an unstretched length thereof of about eight inches is stretched to about eleven inches, or in other words, equals the eleven inches width of the knitted fabric of a stocking to which it is to be sewed.

Referring to the diagrammatic and schematic view Fig. 4, effort has been made to illustrate therein the approximate manner in which the needles, under conditions above set forth, penetrate and form stitches through loops of the knitted fabric in a succession of stitches, six being arbitrarily shown. As appears, at least one loop in every one of the ten wales of loops is penetrated by at least one of the three thread carrying needles. Thus, beginning at the left of Fig. 4, needle 50 penetrates the loop in wale "1" which is located in course "1"; needle 52 penetrates the loop in wale "2" which is located in course "5," and so on. It also follows that the stitches formed by said needle penetrations lock the threads of the knitted fabric against runs in the event of breakage of a thread. There may be occasional conditions in which a wale will not be penetrated by one of the needles. But practical and commercial use and experience have demonstrated that when such instances occur they are of practically negative consequence. While it is preferable that one or more of the needles penetrate and form a locking stitch through one or more loops in every wale, for practical purposes it is sufficient that substantially or approximately every wale be thus penetrated by a needle and locked by the resulting stitch. This prevention of runs is a very important, if not indispensable, feature to the success of the present invention.

The arrangement and concatenation of threads, in seam *d*, which has been found to yield satisfactory results and is therefore preferred, is shown in Figs. 5 and 6. At the upper or right side of the seam, Fig. 5, three needle threads *m, n* and *o* form three parallel rows of stitches respectively, loops of said threads being carried through the work to the under side thereof between successive stitches. At the under or wrong side of the seam, Fig. 6, three looper threads *p, q* and *r* pass through, and also back and forth between the loops in the needle threads $m$, $n$ and $o$. In other words, the arrangement and concatenation of the threads is the same as in the well-known commercial "Flatlock" seam of the Willcox & Gibbs Sewing Machine Company, shown in Borton Patent 883,614, March 31, 1908, and the same as "Stitch type 606" in the "Federal Specification for Stitches; Seams; and Stitching," DDD-S-751, March 4, 1930, with the exception that the threads designated 1, 5 and 6 in said Borton patent have been omitted. Of the three looper threads identified herein as $p$, $q$ and $r$, Fig. 6, thread $p$ extends back and forth between loops of needle thread formed by one of the outside needles and the middle needle; thread $q$ extends back and forth between loops formed by the middle needle and said outside needle; and thread $r$ extends back and forth between loops formed by the other outside needle and the middle needle.

The edge or part of the seam which is uppermost in Fig. 6, where the two looper threads $p$ and $q$ cross back and forth between loops of the thread $n$ of the middle needle and loops of thread $m$ of one outside needle, is the edge or part of the seam which is preferably positioned uppermost in Fig. 3; or in other words, the part of seam $d$ having the two crossing looper threads is toward the middle of the elastic fabric $c$.

The sewing machine used in the aforesaid first sewing machine operation for making the aforesaid seam, and which in practical and commercial operation has been found to give satisfactory results, is the well-known commercial "Flatlock" machine of the Willcox & Gibbs Sewing Machine Company, substantially as illustrated and described in Merritt Patent 1,041,652 of October 15, 1912, except for changes and additions the principal of which will appear from what follows herein. In the changed machine three thread-carrying needles 50, 51, 52 and corresponding thread-carrying loopers are employed, instead of four of each. In the changed machine no means are employed for trimming fabric in advance of the needles or for applying a cross thread in the upper or needle side of the seam. Preferably no take-up means are used for the looper threads; or if used the take-up means are of a character to take up relatively little of the looper threads. Thus there is produced a very elastic seam adapted to stretch, without breakage of thread in the seam, with the stretching of the elastic or garter fabric sewed to the top of the knitted leg.

The feed-off-the-arm work arm of the machine includes an approximately horizontal work supporting part 55 having a free end off which the work is fed. A throat plate 56 is secured to the upper side of the extreme free end of part 55 as by screws 57, 57 and has therethrough longitudinal parallel slots through which rows of teeth of the feed dogs of the four motion differential feed operate in engaging and feeding the work. Feed dogs 60 and 61 of a construction suitable for the changed machine are shown particularly in Figs. 30 to 33 (Sheet 7), the stitch feed dog 60 having four rows of teeth 60a, 60b, 60c and 60d; and the fulling feedless dog 61 having four rows of teeth 61a, 61b, 61c and 61d. A small plate 62, Figs. 7 and 9 (Sheet 3), countersunk in throat plate 56 and secured in place by a small screw has two chaining off fingers 63, 63 projecting into an opening in said throat plate. A removable cover plate 65 on the part 55 of the work-arm in advance of the throat plate 56, has at one end (Fig. 11, Sheet 4) a projecting bevelled lip 66 engaging beneath an undercut edge at the end of said throat plate 56 (Fig. 10, Sheet 3) and at its other end a spring-actuated bolt or latch 67 (Fig. 11), the conical end of said bolt engaging a corresponding socket in a part of the wall of the work-arm not shown. Two guide plates 68 and 69 extending longitudinally of cover plate 65 are secured to the latter by screws 70. The inner edges of plate 65 are undercut (Fig. 12, Sheet 4) for engagement with the bevelled side edges (Fig. 13) of a slide plate or carrier 71.

An edge uncurler device or attachment, which also serves as an edge guide, is mounted on said plate or carrier 71 and includes a base plate 72 secured to carrier 71 by two screws 73 which engage screw-threaded openings 74 in carrier 71. There are three openings 74 (shown in dotted lines in Fig. 14) spaced apart the distance between the screws 73, so that the uncurler device may be secured to carrier 71 in either of two positions, one further advanced toward the presser-foot than the other. As shown in the drawings the uncurler attachment is secured to carrier 71 in the more advanced position provided for by the screw-threaded openings 74 in carrier 71. Furthermore, said openings 74 are somewhat larger (Fig. 9) than the shanks of the screws 73 which pass therethrough, thus permitting limited sidewise adjustment of the position of said base plate for reasons which will presently appear.

An uncurler device or member 75, preferably composed of thin sheet spring steel, has a V-shaped notch opening forwardly (that is, in the direction opposite that of the feed of the machine) said notch being located near the end of member 75 toward the needles. An arm 76 extends forwardly at the right-hand side (upper side in the drawings) of said notch and along one edge of base plate 72; and a shorter arm 77 extends forwardly along the other side of said notch and has an inner inclined edge 78 which is diagonal to the line of feed. The extreme end or tip of the shorter arm 77 bends or curves upwardly at 79. The forward end of longer arm is rigidly secured against the upper surface of the base plate 72 by two screws 80, 80, leaving the uncurler member 75, forward of said screws, free to be sprung upward with reference to the upper surface of base plate 72. A bar 81 is soldered, welded, or otherwise secured at its rearward end to the upper surface of the arm 76 of uncurler member 75. Bar 81 then bends upwardly and extends parallel of the edge of base plate 72 to its forward downwardly bent end 82, which is adapted to contact plate 72 and thus act as a stop to the upward bending of the rearward end of uncurler member 75 by downward pressure upon bar 81. The rear edge of base plate 72 is bevelled at 72a, as shown in Figs. 13 and 14. A fabric edge guiding pin 83 rises from base plate 72 in an opening through uncurler member 75 which opening is of larger diameter than the pin. A narrow plate or flange 84 also rises from base plate 72 (being secured thereto in any suitable manner, as by soldering or welding) along the inner edge of the arm 76 of the uncurler member and also serves in the guiding of the fabric edge. Thus in general the uncurler device also serves in the guiding of the fabric edge to its proper position in passing under the needles for the formation of stitches therethrough.

In the modified construction of uncurler device shown in Figs. 15, 16 and 17 (Sheet 4) the screws 73, 73, which secure base plate 72 to carrier or slide plate 71, pass through a slot 85 in said plate 72, which slot is preferably slightly wider than the diameter of the shanks of the screws to provide for sidewise adjustment of plate 72 on carried plate 71, as before. In this instance an elongated block 86 is secured by screws 87, 87, Fig. 17, along one side of plate 72. At one end said block 86 is narrowed horizontally by offsets at 88, 88, Figs. 15 and 16. An elongated lever plate 89 overlies block 86, bends downward in a vertical portion 90 extending across the narrower end of said block and then continues rearward in a short horizontal portion 9 which overlies the end of the arm 76 of the uncurler member and is secured to the latter by screws 92, 92 (Fig. 17). Two ears or lugs 93, 93 formed integral with the side edges of the vertical middle portion 89 of the lever plate and embrace between them the narrower end of the block at pin 94, passing through said ears and the interposed end of the block, pivotally connect the lever plate to the block. A screw threaded opening 95 bored longitudinally through block 86 houses a coiled spring 96 one end of which bears against the inner surface of the middle vertical portion 90 of lever plate 89 and the other end of which bears against the inner end of a screw threaded plug 98 in the forward end of screw threaded opening 95. Plug 98 has a milled head at its outer or other end and a lock nut 97 secures the plug in adjusted position to properly tension spring 96. As will be apparent, downward pressure upon the forward end of lever plate 89 will rock the same on pivot 94 and against the pressure of spring 96 and thus raise the rear end of the uncurler member.

The machine frame includes a part 100 (Figs. 8 and 10, Sheet 3) of the machine which overlies the end of the work supporting part 55 of the work arm and carries a vertically movable needle bar 101 and a vertically movable presser foot carrying bar 102. Bar 102 is pressed downward by a spring not shown. The end of a rock arm 103 for lifting the presser foot is shown in Figs. 7 and 10 (Sheet 3). It corresponds with the similar rock arm shown in Fig. 75 (Sheet 29) of the aforesaid Merritt Patent 1,041,652 and constitutes part of the presser foot lifting means described in said patent beginning at the end of the first column on page 12 of the specification thereof. Actuation of a knee lifter lever, or of a treadle (neither of which is shown), against a spring (also not shown) moves rock arm 103 from the position in which it is shown in Fig. 7 to that in which it is shown in Fig. 10. The rock arm 103 may also be actuated to lift the presser foot by a hand lever not shown but similar to lever 731, Fig. 75 of said Merritt patent.

104, Figs. 7, 10 and 10a, is a stop spring, made of relatively stiff spring sheet steel, secured by screws through holes therein, or by other suitable means, to the underside of a portion 100a of the head of the machine which depends to a lower level than part 100. The outer end of this spring is bent downward and then horizontally at 104a in a part which is positioned to contact the rear end of the upper edge of the side flange or ledge 107 of the presser foot (about to be described) as the latter is lifted to the position in which it is shown in Fig. 10 with the effect of tilting the foot upward at its forward end for the purpose more fully explained hereinafter. Spring 104 serves another important function. Should the machine be operated inadvertently while the presser foot is elevated to the position in which it is shown in Fig. 10 by the presser foot lifting means, the lower end of the needle bar 101, upon nearing the limit of its downward movement, would strike the forward end of the presser foot. Under that condition the impact of the engagement would be yieldingly cushioned by spring 104 and prevent damage to parts on the machine.

The presser foot of the machine will be described with particular reference to Figs. 18 to 21a, Sheet 4. It has a shank portion clamped at its upper end to the lower end of the presser bar 102 (Fig. 7); the shank then depends in a vertical portion at the lower end of which is a horizontal portion 105 of rectangular outline, Figs. 19 and 20, which fits in a recess between two upstanding side ledges or flanges 106, 107 on the presser foot proper 108. A horizontal screw pivot 109 (Fig. 21a) passes through flanges 106, 107 and the interposed shank portion 105, an enlarged portion of the pivot next to its screw head being threaded for engagement with a corresponding threaded opening through flange 106. The presser foot proper 108 is thus pivotally connected to the presser foot shank to tilt upward at its forward end on screw pivot 109. Three vertical longitudinal needle openings 110 pass through the presser foot proper 108 close to the forward edge of part 105 of the shank (Figs. 19 and 20).

The wider portion of the bottom surface of the presser foot proper 108 (when the same is in place in the machine) along one longitudinal side thereof (the side through which the needle holes 110 pass) is at a slightly higher elevation than the narrower portion of said surface along the other side of the foot. This produces a guiding offset or shoulder 111 (Figs. 20 and 22) extending longitudinally of said bottom surface of the foot. At the forward end or toe of the presser foot the wider side of its bottom surface curves upward at 112. At the forward end of the narrower portion of said bottom surface said narrower portion has an arm 113, preferably formed integral with said narrow portion, projecting transversely toward the right and underlying the upwardly curved portion 112 of the wider portion of the bottom surface. The bottom surface of said arm 113, for a portion of its width, is flush with the narrower portion of the bottom surface from which it extends laterally; said bottom surface of arm 113 then curves sharply upward at 114. In other words, there is formed between the upper surface of arm 113 and the overlying upwardly curved bottom surface 112, a downwardly curved guiding channel or slot 115 (for guiding the elastic fabric c as presently explained) closed at its left hand end and open at its right hand end and the purpose of which will now be explained.

Referring particularly to Sheet 7 of the drawings, Fig. 27 shows in top plan view and more or less schematically and diagrammatically, and Figs. 28–30 likewise shows in transverse sectional views, the overlapping relationship of the edges of the knitted fabric b and elastic material c, as the same are fed by the feed dogs beneath the presser foot and past the needles which operate through the needle holes 110. It has been impossible to show the fabrics and the feed dogs in their real relationship, but in Figs. 28–30 the points of the teeth of the dogs are supposed to be in feeding engagement with the fabrics; although in Figs. 29 and 30 for example the teeth 60d are shown as not contacting the elastic fabric c with which they are supposed to be in gripping engagement at this point. However, it is believed that the action of the feed teeth in engaging and feeding the fabric will be clearly understood from what has been shown. As shown in Fig. 28, the feed teeth 61a, 61b, 61c, are acting to grip fabric b against the bottom surface of the arm 113 at the bottom surface of the foot; and the garter or elastic fabric c is passing through slot or notch 115 above said arm 113 and is being guided thereby, and particularly by the end wall at the closed end of said slot, which end wall is approximately in line with the offset or shoulder 111 along the bottom surface of the foot. This is shown in Fig. 29 which is a sectional view just in advance of the needles, as before explained. As shown thereby, the garter fabric c has passed from its guiding slot 115 and its inner edge is contiguous to the guiding shoulder or offset 111 and the feed dogs 60 and 60d are supposed to be in engagement with fabrics b and c respectively.

The sewing machine and parts or attachments for sewing the garter fabric to the stocking or stocking web, having been described, said operation itself will now be described with particular reference to Figs. 23 to 26. At this point it should be explained that it is preferred to draw the garter fabric c from a roll or spool thereof (not shown) located at some convenient point. It is now customary in some instances to place a roll of this fabric on the machine table at the right of the operator for her to draw off or feed the fabric from such roll. Assuming that an unstretched length of the garter fabric of about eight inches is to be stretched to, and in that condition sewed to, about an eleven inch width of the knitted fabric at the top of the stocking, as heretofore explained, under those conditions it is preferred to have marks or lines, such as shown at x in Figs. 2 and 24, drawn across the garter fabric approximately eight and one quarter inches apart. The lines x are, of course, drawn across the garter fabric preparatory to its use in the manner indicated in Figs. 23-26. As shown in Fig. 23, the machine operator has begun the sewing of the garter fabric c to the upper edge of the knitted fabric b, of say what is the first of a bundle of twenty-four stockings or webs (to constitute a dozen pairs of stockings when finished). With her right hand the operator is gripping the garter fabric and while stretching it is guiding the stretched fabric to the guiding slot 115 of the presser foot. The uncurler 75 is in its forward or operative position (in which position it is also shown in Figs. 7 and 8) and the presser foot is down. The forward part of the top edge of the leg fabric b has been carried well under the presser foot, by the feeding mechanism, and sewed to the garter fabric c up to the needle holes 110. With her left hand, the operator is holding the edge of the leg fabric b to the position shown, in which position it obscures the upstanding guiding plate or flange 84 (see Figs. 13 and 14, Sheet 4). Said edge of fabric b is spread out in an approximately horizontal position along the work supporting upper surface of the work arm 55 of the machine and is passing under the spring uncurler plate 75, which is pressing down upon it, past the inclined edge 78 thereof (which edge is acting to uncurl the fabric edge), against the guiding pin 83, and thence passes under the presser foot in the relative position to the garter fabric c shown in Figs. 27, 29 and 30 (Sheet 7).

As shown in Fig. 24, the sewing of the garter fabric to the leg fabric has progressed to a point close to the end of the first stocking or web and the uncurler 75 has been moved to the right, to its inoperative or out of the way position, by the operator. Before so moving the uncurler the operator preferably uses the third finger of her right hand to press downward upon bar 81 and lift the uncurler 75 and release its downward pressure upon fabric b. With the same finger she then moves the uncurler backward from its active position in which it is shown in Fig. 23 to its inactive position in which it is shown in Fig. 24. The operating of the sewing machine is continued (preferably without stopping) until the stitch formation (constituting seam d) passes off the leg fabric and along the garter fabric a short distance until it reaches approximately the cross mark x on said fabric (Fig. 24). The sewing machine is then stopped and the presser foot 108 lifted, whereupon the spring 104 acts to tilt the foot upward at its forward end (in the manner previously described) to the position shown in Fig. 25, Sheet 5, thereby giving the operator unobstructed space and clear vision for bringing the upper edge of the knitted fabric of the next or second stocking or web into proper position, shown in Fig. 25, with relation to the garter fabric and the parts of the sewing machine. As shown in Fig. 25, the operator is holding the garter fabric elevated with the thumb and first finger of the right hand, and is positioning the leg fabric with her left hand. As shown in Fig. 26, the operator has lowered the presser foot and while pressing downward upon bar 81 to lift uncurler plate 75 has moved the same forward to its active position with the edge of the leg fabric engaged under said uncurler plate, such positioning of the fabric beneath said plate having been assisted by the upwardly curved extremity 79 of the arm 77. Everything is now ready to start the sewing machine and repeat, as to the second stocking, the sewing thereto of garter fabric, in the same manner as described above with respect to the first stocking. As shown in Fig. 2, the left hand side edge of each stocking or web is preferably positioned to approximately flush a line x across the garter fabric, and the fabric is so stretched during the sewing as to leave about one quarter of an inch (of the eight and one quarter inches between marks) extending beyond the right hand side of the stocking.

While the order of procedure and of handling the fabrics and starting and stopping the sewing machine, as above indicated, is preferred to obtain maximum speed of production with minimum delays occasioned by starting and stopping the machine, different orders of procedure may be adopted.

In the operation of sewing garter fabric to the knitted stocking fabric described above in connection with Figs. 23-26, the action of the uncurler 75 and the downward pressure exerted thereby in removing the curl from the edge of the stocking fabric, and the action of the feed dogs in advance of the needles, and particularly both together, cause the edge of the knitted leg fabric to be presented under the needles with the courses and wales of the knitting in the approximate positions shown in Fig. 4 (Sheet 2), where the needles penetrate and form stitches through said fabric in the manner previously described with reference to said Fig. 4, thereby locking approximately all the wales and preventing runs.

What is claimed as new is:

1. Means for sewing together sections of fabric, said means including in combination: stitch forming mechanism having one or more needles and a presser foot; and uncurling means positioned in advance of the presser foot, said means consisting of a work supporting member and a resilient uncurler member in active position bearing against said work supporting member to uncurl the edge of a fabric section fed therebetween, and means spaced forwardly of said resilient uncurler member and connected thereto for disengaging said uncurler member from said work supporting member for the insertion of a new fabric section.

2. Means for sewing together sections of fabric, said means including in combination: stitch forming mechanism having one or more needles and a presser foot; and uncurling means positioned in advance of the presser foot, said means consisting of a work supporting member and a resilient uncurler member in active position bearing against said work supporting member to uncurl the edge of a fabric section fed therebetween, spring means for pressing said uncurler member against said work supporting member, and a lever arm attached to said uncurler member for disengaging said uncurler member from said work supporting member for the insertion of a new fabric section.

3. Means for sewing together sections of knitted fabric and woven fabric, said means including: stitch forming mechanism having a plurality of needles and a presser foot, and edge uncurling means for the edge of the knitted fabric consisting of a work supporting member and a resilient uncurler member bearing against said work supporting member, said uncurler member having a V-shaped notch opening in a direction opposite to the direction of feed for uncurling the edge of knitted fabric fed between said uncurler member and said supporting member, and for turning the wales of said knitted fabric at an oblique angle with relation to the line of seam.

4. Means for sewing together sections of knitted fabric and woven fabric, said means including: stitch forming mechanism having one or more needles and a presser foot, and edge uncurling means for the edge of the knitted fabric consisting of a work supporting member and a resilient uncurler member bearing against said work supporting member and having an arm with one edge thereof disposed oblique to the line of seam and forming a V-shaped notch opening in a direction opposite to the direction of feed; said oblique edge and said notch performing simultaneously the operations of uncurling the edge of knitted fabric fed between said uncurler member and said supporting member, and of turning the wales of said knitted fabric at an oblique angle with relation to the line of seam.

5. Means for sewing together sections of knitted fabric and woven fabric with the edge portions thereof in overlapped relationship, said means including work supporting means and stitch forming mechanism having a plurality of stitch forming needles; means for uncurling the edge of knitted fabric consisting of a work supporting member, a resilient uncurler member bearing against said work supporting member and having an edge portion oblique to the line of seam for turning the wales of said knitted fabric at an oblique angle with relation to said line of seam, a presser foot having a guiding channel therein for the woven fabric, said channel forming a toe at the forward end of the presser foot, said toe and said uncurler member being disposed close together in operative position so that the knitted fabric uncurled and turned by the uncurler member is maintained in that condition by said toe until said fabric is overlapped by the woven fabric and sewed.

6. Means for sewing together sections of fabric, said means including in combination: stitch forming mechanism having one or more needles and a presser foot; and uncurling means positioned in advance of the presser foot, said means consisting of a work supporting member and a resilient uncurler member in active position bearing against said work supporting member to uncurl the edge of a fabric section fed therebetween, spring means for pressing said uncurler member against said work supporting member, and means for adjusting the pressure of said spring means.

7. Means for sewing together sections of fabric, one section whereof is knitted fabric, said means including stitch forming mechanism having a plurality of needles and a presser foot, and edge uncurling means for the edge of the knitted fabric consisting of a pair of members disposed in yielding contact with each other in operative position, one of said members having a V-shaped notch opening in a direction opposite to the line of feed for uncurling the edge of the knitted fabric fed between said members, and for turning the wales thereof at an oblique angle with relation to the line of seam.

GRIFFITH M. LEWIS.